(12) United States Patent
Yamaoka et al.

(10) Patent No.: US 6,404,729 B1
(45) Date of Patent: *Jun. 11, 2002

(54) OPTICAL DISC

(75) Inventors: Nobuki Yamaoka; Satoru Fukuoka, both of Yamanashi (JP)

(73) Assignees: Pioneer Video Corporation, Yamanashi; Pioneer Electronic Corporation, Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/337,345
(22) Filed: Jun. 21, 1999

(30) Foreign Application Priority Data

Jun. 22, 1998 (JP) .......................... 10-191084

(51) Int. Cl.⁷ ................................. G11B 7/24
(52) U.S. Cl. .................................. 369/275.4
(58) Field of Search ...................... 369/275.4, 275.3, 369/275.1, 284, 288

(56) References Cited

U.S. PATENT DOCUMENTS

| | | | | |
|---|---|---|---|---|
| 5,191,564 A | * | 3/1993 | Hosokawa | 369/275.2 |
| 5,370,970 A | * | 12/1994 | Tanaka et al. | 369/275.2 |
| 5,477,524 A | * | 12/1995 | Deguchi et al. | 369/275.4 |
| 5,477,526 A | * | 12/1995 | Inoue | 369/275.4 |
| 5,493,552 A | * | 2/1996 | Kobori | 369/275.4 |
| 5,594,716 A | * | 1/1997 | Inoue | 369/275.4 |
| 5,600,627 A | * | 2/1997 | Hirokane et al. | 369/275.4 |
| 5,602,813 A | * | 2/1997 | Furumiya | 369/275.4 |
| 5,602,823 A | * | 2/1997 | Aoki et al. | 369/275.4 |

* cited by examiner

*Primary Examiner*—Allen Cao
(74) *Attorney, Agent, or Firm*—Morgan, Lewis & Bockius LLP

(57) ABSTRACT

An optical disc comprises; a substrate; grooves concentrically or helically formed on the substrate in each of which data is recorded; lands defined between the adjacent grooves; and prepits formed on the lands, wherein each of the prepits is disposed to be shifted from a center line of the land toward a groove to be paired without overlapping with adjacent tracks, whereby reducing cross-talk from adjacent tracks and improving the density of recorded data.

6 Claims, 2 Drawing Sheets

← INNER PERIPHERAL SIDE

← INNER PERIPHERAL SIDE

OPTICAL DISC

BACKGROUND OF THE INVENTION

1. Field of the Invention

The present invention relates to optical discs capable being written such as DVD-R, DVD-RW and the like and particularly to an optical disc suitable for recording data signals at a high density.

2. Description of the Related Art

There have been known as optical information recording mediums such as an optical disc on which information signals may be written by irradiation of a laser beam, utilizing a dye recording layer or phase changing recording layer.

In such optical discs, for example, grooves $2a$ to $2c$ are concentrically or helically provided on a transparent circular substrate 1 of an optical disc about the center thereof, as shown in FIG. 2. Lands $3a$ to $3c$ are disposed between grooves $2a$ to $2c$. Prepits $4a$ to $4c$ are arranged on the center line thereof with a given interval. The prepits correspond to, for example, address information signals and the like.

In this case, the prepit pairs with the adjacent groove positioned at the inner peripheral side (which is directed by an arrow in the figure) in such a manner that prepits $4a$ to $4c$ correspond to grooves $2a$ to $2c$ respectively. In addition, a recording layer, a reflecting layer, a protective layer and the like are layered in turn on the surface of the transparent substrate 1 on which the grooves are formed.

In the writing operation of the optical disc, data is written in groove $2b$, while for example a light beam spot 5 is controlled to trace out the groove $2b$ so that address information signals and the like due to cross-talk caused by prepit $4b$ are read out. Similarly, in the reading-out operation of the optical disc, recorded data is read out from the groove $2b$, while for example a light beam spot 5 is controlled to trace out the groove $2b$ so that address information signals and the like due to cross-talk caused by prepit $4b$ are read out.

Whereas, although the recording density may be improved by reducing the track pitch in the optical disc, the reduction of the track pitch brings a problem that cross-talk caused by prepit other adjacent tracks increases i.e., prepit signals of the adjacent tracks leak out.

For example as shown in FIG. 2, when light beam spot 5 tracks groove $2b$ to reproduce the recorded information signals, light beam spot 5 is irradiated onto not only prepit $4b$ of the outer peripheral side but also prepit $4a$ for the adjacent track positioned at the inner peripheral side. In this case, prepit of the adjacent track i.e., prepit $4a$ is positioned at the inner peripheral side of the tracking groove $2b$ generates cross-talk, so that the quality of reproduced signals of data record in groove $2b$ is reduced, and at the same time, it may be difficult to read out address information signals reproduced from prepit $4b$ of the outer peripheral side.

SUMMARY OF THE INVENTION

The present invention has been made in view of the problem mentioned above, and its object is to provide an optical disc capable of reducing cross-talk from adjacent tracks and improving the density of recorded data.

An optical disc according to the present invention comprises;

a substrate;

grooves concentrically or helically formed on said substrate in each of which data is recorded;

lands defined between the adjacent grooves; and prepits formed on said lands, wherein each of said prepits is disposed to be shifted from a center line of said land toward a groove to be paired without overlapping with adjacent tracks.

According to the optical disc of the invention, any unwanted influence of cross-talk does not suffer from the adjacent prepit in the inner peripheral side, since each prepit is disposed to be shifted from the center line of the land toward a groove to be paired without overlapping adjacent tracks.

DESCRIPTION OF THE PREFERRED EMBODIMENT

An embodiment of the present invention will now be described below with reference to the accompanying drawings.

Figure 1:
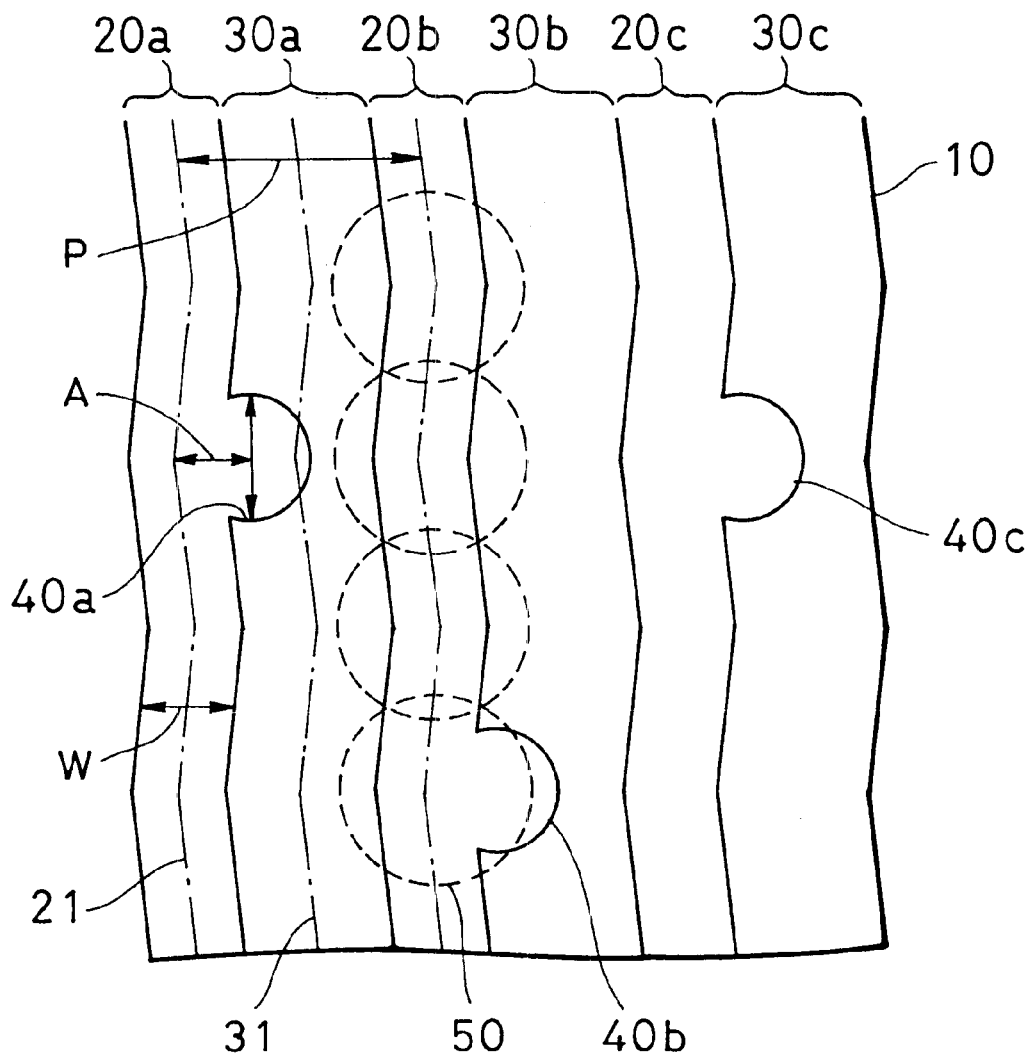
FIG. 1 is a plan view enlarged partly showing a recording surface of an optical disc of an embodiment according to the invention.
Figure 2:
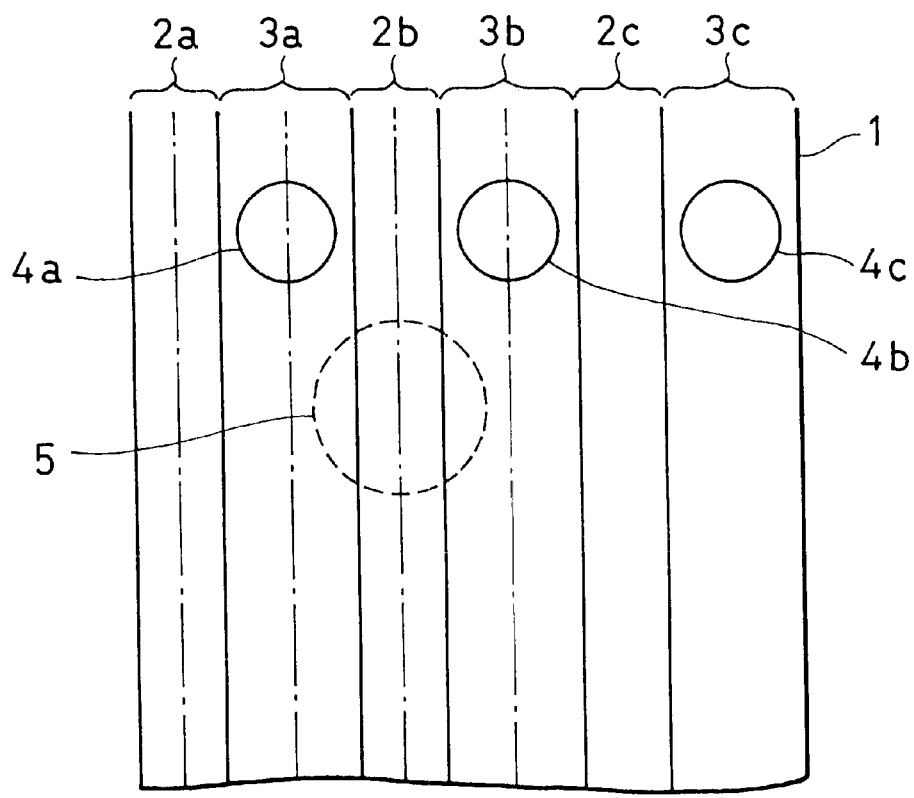
FIG. 2 is a plan view enlarged partly showing a recording surface of an conventional optical disc.

FIG. 1 explains an embodiment of an optical disc according to the invention in which the arrangement of prepits and light beam spots irradiated for reproducing recorded signals.

The optical disc according to the invention comprises a circular transparent substrate 10 on which grooves are concentrically or helically formed about the center thereof. The grooves $20a$ to $20c$ each having a width W ranging 0.4 $\mu m \geq W \geq 0.1$ $\mu m$ are formed with a track pitch P ranging 1.0 $\mu m \geq P \geq 0.3$ $\mu m$. Each of lands $30a$ to $30c$ is defined between the adjacent grooves 20.

Each of lands $30a$ to $30c$ has one or more prepits $40a$ to $40c$ each having an emboss shape (phase structure) at a given interval. The prepit pairs with the adjacent groove positioned at the inner peripheral side (which is directed by an arrow in the figure) in such a manner that prepits $40a$ to $40c$ correspond to grooves $20a$ to $20c$ respectively.

Each of prepits $40a$ to $40c$ is formed to be shifted toward the inner peripheral side with respect to the center line 31 of land 30 so that the adjacent track does not overlap with any non-paired prepit. Namely, each prepit is disposed near the groove 20 to be paired. The distance A from the center line 21 of groove 20 to the center line of prepit 40 is set with respect to the track pitch P in such a manner that the following inequality relationship is satisfied:

$$0 < A < P/2.$$

The lands $30a$ to $30c$ are provided with recesses or coves due to prepits $40a$ to $40c$ at the inner peripheral sides respectively. Namely prepits $40a$ to $40c$ are formed as round notches at the inner peripheral sides of the lands. The prepits $40a$ to $40c$ are disposed in such a manner that, when the light beam spot 50 for recording or reproducing data is tracked along with, for example, groove $20b$ and the light beam spot 50 runs on the groove $20b$ in the peripheral direction i.e., track direction, a region irradiated by the light beam spot 50 includes prepit $40b$ to be paired with the adjacent land $30b$ at the outer peripheral side, but not prepit $40a$ of the adjacent land $30a$ at the inner peripheral side.

In addition to that the prepit 40 pairs off the groove 20 of the inner peripheral side thereof and thus is shifted toward the inner peripheral side with respect to the central position of the land 30, the prepit 40 may be formed at a position shifted toward the outer peripheral side with respect to the central position of the land 30 when the prepit 40 pairs off the groove 20 of the outer peripheral side thereof.

In case that the optical disc according to the invention is for example a phase changing type optical disc, a first dielectric layer, a phase changing recording layer, a second dielectric layer, and a metal reflecting layer are layered in turn in this order on the surface of the transparent substrate 10 on which groove 20 and prepits 40 are previously formed by the sputtering method. In addition, a UV curable resin fluid is spin-coated on the metal reflecting layer and hardened by the UV irradiation, so that a protective layer made of a UV curable resin is formed.

Two of such phase changing type optical discs with a protective layer are prepared, and then adhered to each other at protective layer sides while aligned at the centers thereof. In this way a double sided optical disc may be manufactured.

Next, there is described the operations of writing and reading data onto the optical disc according to the present invention.

The light beam spot 50 traces along, for example, groove 20b and then reads prepit 40b, which is previously formed as one of sync. pits indicating a position of starting for the sector information or one of address pits carrying the sector information including address information signals. Then, the light beam spot 50 writes the corresponding data on the groove 20b.

In this time, the light beam spot 50 can perfectly reads data from prepit 40b without influenced by the cross-talk due to prepit 40a of the adjacent track at the inner peripheral side, because the distance A from the center line 21 of groove 20 to the center line of prepit 40 is previously set with respect to the track pitch P in such a manner that the expression of inequality $0<A<P/2$ is satisfied, as above mentioned.

In addition, the quality of signals read from the written data in the groove 20b is not affected by deteriorated ions, because the light beam spot 50 does not pass over prepit 40a of the adjacent track at the inner peripheral side w hen the light beam spot 50 follows the groove 20b.

On the other had, the groove 20 is formed as a wobbling groove to meander periodically on the disc across the radial direction thereof so as to carry a wobbling signal with a single frequency. By using the wobbling signal reproduced from the wobbling groove, the optical disc is controlled in its rotation.

In the case that the recording or reproducing of data is preformed for the optical disc, the position of the light beam spot 50 on the optical disc is controlled on the basis of the positional information detected from prepit 40 of the land 30 while the optical disc is controlled in its rotation by using the wobbling signal detected from the wobbling groove.

As described above, according to the optical disc of the present invention, each of the prepits is disposed to be shifted from a center line of the land toward a groove to be paired without overlapping adjacent tracks. Thus, an optical disc capable of reducing cross-talk from adjacent tracks and improving the density of recorded data is obtained.

What is claimed is:

1. An optical disc on which information signals are to be written by irradiation of a laser beam in a groove comprising:

a substrate;

grooves concentrically or helically formed on said substrate and having a recording layer, wherein neighboring of the grooves defines lands therebetween respective pairs of the neighboring grooves, and each of said grooves is paired with a neighboring one of the lands located on one side of said each groove; and prepits formed as notches at a side of the paired land, wherein each of said prepits is deviated from a center line of said land toward the paired groove without overlapping with neighboring lands in a radial direction of the disc.

2. An optical disc according to claim 1, wherein the prepit is shifted so as to satisfy an expression of inequality $0<A<P/2$ wherein A denotes a distance from a center line of the groove to a center line of the prepit, and P denotes a track pitch.

3. An optical disc according to claim 1, wherein the prepit is formed in a form of recess.

4. An optical disc according to claim 1, wherein the groove is formed as a wobbling groove to meander periodically on the disc across the radial direction thereof so as to carry a wobbling signal with a single frequency.

5. An optical disc comprising:

a substrate;

a plurality of grooves on said substrate; and a plurality of lands between said grooves on said substrate, wherein each of the plurality of grooves is to be paired with an adjacent one of the plurality of lands, and wherein a plurality of prepits are formed on at least one of the plurality of lands for a corresponding groove that is paired to said at least one of the plurality of lands, in a manner that when a light beam is used to follow said corresponding groove, prepits formed on lands that are not paired with said corresponding groove do not locate within the path of the light beam.

6. An optical disc according to claim 5, wherein the plurality of prepits are formed off a center line of the at least one of the plurality of lands and toward the corresponding groove.

* * * * *